(12) United States Patent
Zhang et al.

(10) Patent No.: US 11,533,209 B2
(45) Date of Patent: *Dec. 20, 2022

(54) DETERMINING NUMBER OF MIDAMBLES IN A PACKET

(71) Applicant: NXP USA, INC., Austin, TX (US)

(72) Inventors: Yan Zhang, Palo Alto, CA (US);
Hongyuan Zhang, Fremont, CA (US);
Rui Cao, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 236 days.

This patent is subject to a terminal disclaimer.

(21) Appl. No.: 16/907,848

(22) Filed: Jun. 22, 2020

(65) Prior Publication Data

US 2020/0322197 A1 Oct. 8, 2020

Related U.S. Application Data (63) Continuation of application No. 16/135,852, filed on Sep. 19, 2018, now Pat. No. 10,715,365.

(60) Provisional application No. 62/591,623, filed on Nov. 28, 2017, provisional application No. 62/561,972, filed on Sep. 22, 2017.

(51) Int. Cl.
*H04W 24/04* (2009.01)
*H04W 72/02* (2009.01)
*H04W 80/02* (2009.01)
*H04L 27/26* (2006.01)
*H04L 5/00* (2006.01)
*H04W 24/08* (2009.01)

(52) U.S. Cl.
CPC ........ *H04L 27/2613* (2013.01); *H04L 5/0051* (2013.01); *H04L 5/0092* (2013.01); *H04L 27/2605* (2013.01); *H04L 27/2666* (2013.01); *H04W 24/08* (2013.01); *H04L 5/0007* (2013.01); *H04W 80/02* (2013.01)

(58) Field of Classification Search
None
See application file for complete search history.

(56) References Cited

U.S. PATENT DOCUMENTS

2018/0146076 A1* 5/2018 Verma .............. H04L 69/22
2020/0228634 A1* 7/2020 Noh ................. H04L 27/2603

* cited by examiner

*Primary Examiner* — Duc T Duong (57) ABSTRACT

A communication device receives a physical layer (PHY) protocol data unit (PPDU). The PPDU includes i) a PHY preamble and ii) PHY data portion that includes one or more PHY midambles, and the PHY preamble includes i) an indication of a length of the PPDU, and ii) an indication of a periodicity of PHY midambles in the PHY data portion. The communication device calculates a number of PHY midambles in the PPDU using i) the indication of the length of the PPDU, and ii) the indication of the periodicity of PHY midambles. The communication device calculates a reception time for the PPDU using the calculated number of PHY midambles, and processes the PPDU using the calculated reception time.

5 Claims, 6 Drawing Sheets

DETERMINING NUMBER OF MIDAMBLES IN A PACKET

CROSS-REFERENCES TO RELATED APPLICATIONS

This application is a continuation application of U.S. patent application entitled "DETERMINING NUMBER OF MIDAMBLES IN A PACKET", having a serial number of Ser. No. 16/135852, having a filing date of Sep. 19, 2018; which claims the benefit of the U.S. provisional application entitled "HE PPDU with efficient Midamble Transmission and Reception in 802.11ax", having a serial number of 62/591623, and having a filling date of Nov. 28, 2017; which claims the benefit of the U.S. provisional application entitled "HIGH-EFFICIENCY PHYSICAL LAYER PROTOCOL DATA UNIT WITH MIDAMBLE TRANSMISSION AND RECEPTION IN 802.11ax", having a serial number of 62/561972, and having a filling date of Sep. 22, 2017, having common inventors, and having a common assignee, all of which is incorporated by reference in its entirety.

This application claims the benefit of U.S. Provisional Patent Application No. 62/561,972, entitled "High Efficiency Physical Layer Protocol Data Unit with Midamble Transmission and Reception in 802.11ax," filed on Sep. 22, 2017, and U.S. Provisional Patent Application No. 62/591,623, entitled "HE PPDU with Efficient Midamble Transmission and Reception in 802.11ax," filed on Nov. 28, 2017. Both of the applications referenced above are incorporated by reference herein in their entireties.

FIELD OF THE DISCLOSURE

The present disclosure relates generally to communication networks and, more particularly, to physical layer protocol data units having midambles.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method for wireless communication includes: receiving, at a communication device, a physical layer (PHY) protocol data unit (PPDU), wherein the PPDU includes i) a PHY preamble and ii) PHY data portion that includes one or more PHY midambles, and wherein the PHY preamble includes i) an indication of a length of the PPDU, and ii) an indication of a periodicity of PHY midambles in the PHY data portion; calculating, at the communication device, a number of PHY midambles in the PPDU using i) the indication of the length of the PPDU, and ii) the indication of the periodicity of PHY midambles; calculating, at the communication device, a reception time for the PPDU using the calculated number of PHY midambles; and processing, at the communication device, the PPDU using the calculated reception time.

In another embodiment, an apparatus comprises a network interface device having one or more integrated circuit (IC) devices. The one or more IC devices are configured to: receive a physical layer (PHY) protocol data unit (PPDU), wherein the PPDU includes i) a PHY preamble and ii) PHY data portion that includes one or more PHY midambles, and wherein the PHY preamble includes i) an indication of a length of the PPDU, and ii) an indication of a periodicity of PHY midambles in the PHY data portion; calculate a number of PHY midambles in the PPDU using i) the indication of the length of the PPDU, and ii) the indication of the periodicity of PHY midambles; calculate a reception time for the PPDU using the calculated number of PHY midambles; and process the PPDU using the calculated reception time.

In yet another embodiment, a method for wireless communication includes: determining, at a communication device, a periodicity of physical layer (PHY) midambles to be included in PHY data portion of a PHY protocol data unit (PPDU), wherein the periodicity of PHY midambles is in units of orthogonal frequency division multiplexing (OFDM) symbols; determining, at the communication device, a number of PHY midambles to be included in the PHY data portion using i) the periodicity of PHY midambles, and ii) a number of OFDM symbols in the PHY data portion. Determining the number of PHY midambles includes: determining that a further PHY midamble will be included in the PHY data portion when a number of OFDM symbols remaining in the PHY data portion after a last PHY midamble is greater than or equal to a sum of i) the periodicity of PHY midambles, and ii) a positive integer that is less than the periodicity of PHY midambles; and determining that the further PHY midamble will not be included in the PHY data portion when the number of OFDM symbols remaining in the PHY data portion after the last PHY midamble is less than the sum of i) the periodicity of PHY midambles, and ii) the positive integer. The method also comprises: calculating, at the communication device, a transmit time for the PPDU using i) the calculated number of PHY midambles, and ii) the number of OFDM symbols in the PHY data portion; determining, at the communication device, an indication of a length of the PPDU using the calculated transmit time; and generating, at the communication device, the PPDU to include i) a PHY preamble, and ii) the PHY data portion with one or more PHY midambles included in the PHY data portion according to the calculated number of PHY midambles, wherein the PHY preamble includes i) the indication of the length of the PPDU, and ii) an indication of the periodicity of PHY midambles in the PHY data portion.

In still another embodiment, an apparatus comprises a network interface device having one or more integrated circuit (IC) devices. The one or more IC devices are configured to: determine a periodicity of physical layer (PHY) midambles to be included in PHY data portion of a PHY protocol data unit (PPDU), wherein the periodicity of PHY midambles is in units of orthogonal frequency division multiplexing (OFDM) symbols, and determine a number of PHY midambles to be included in the PHY data portion using i) the periodicity of PHY midambles, and ii) a number of OFDM symbols in the PHY data portion. Determining the number of PHY midambles includes: determining that a further PHY midamble will be included in the PHY data portion when a number of OFDM symbols remaining in the PHY data portion after a last PHY midamble is greater than or equal to a sum of i) the periodicity of PHY midambles, and ii) a positive integer that is less than the periodicity of PHY midambles; and determining that the further PHY midamble will not be included in the PHY data portion when the number of OFDM symbols remaining in the PHY data portion after the last PHY midamble is less than the sum of i) the periodicity of PHY midambles, and ii) the positive integer. The one or more IC devices are further configured to: calculate a transmit time for the PPDU using i) the calculated number of PHY midambles, and ii) the number of OFDM symbols in the PHY data portion; determine an indication of a length of the PPDU using the calculated transmit time; and generate the PPDU to include i) a PHY preamble, and ii) the PHY data portion with one or more PHY midambles included in the PHY data portion according to the calculated number of PHY midambles, wherein the PHY preamble includes i) the indication of the length of the PPDU, and ii) an indication of the periodicity of PHY midambles in the PHY data portion.

In another embodiment, a method for wireless communication includes: receiving, at a communication device, a trigger frame to solicit a physical layer (PHY) protocol data unit (PPDU) from the communication device, wherein the trigger frame includes i) an indication of a length of the PPDU, and ii) an indication of a periodicity of PHY midambles in a PHY data portion of the PPDU; calculating, at the communication device, a number of PHY midambles in the PPDU using i) the indication of the length of the PPDU, and ii) the indication of the periodicity of PHY midambles; generating, at the communication device, the PPDU to include i) a PHY preamble, and ii) the PHY data portion with one or more PHY midambles included in the PHY data portion according to the calculated number of PHY midambles; and transmitting, from the communication device, the PPDU in response to the received trigger frame.

In still another embodiment, an apparatus, comprises a network interface device having one or more integrated circuit (IC) devices. The one or more IC devices are configured to: receive a trigger frame to solicit a physical layer (PHY) protocol data unit (PPDU) from the communication device, wherein the trigger frame includes i) an indication of a length of the PPDU, and ii) an indication of a periodicity of PHY midambles in a PHY data portion of the PPDU; calculate a number of PHY midambles in the PPDU using i) the indication of the length of the PPDU, and ii) the indication of the periodicity of PHY midambles; generate the PPDU to include i) a PHY preamble, and ii) the PHY data portion with one or more PHY midambles included in the PHY data portion according to the calculated number of PHY midambles; and transmit the PPDU in response to the received trigger frame.

DETAILED DESCRIPTION

In embodiments described below, communication devices such as an access point (AP) and client stations of a wireless local area network (WLAN) transmit data streams between the AP and the client stations. To enable receiving devices to properly demodulate data portions of data units, transmitting devices include training fields, generated so as to enable accurate estimation of a communication channel, in the physical layer (PHY) preamble of at least some of the data units. To compensate for Doppler effects, or when otherwise desired, transmitting devices include training fields in a PHY midamble in at least some of the data units. In particular, a wireless network device transmits a PHY midamble between portions of a data payload of a single PHY protocol data unit, so as to enable updating a channel estimate (or re-estimating the communication channel) during the transmission of the single PHY protocol data unit. A wireless network device that receives a PHY midamble in a single PHY protocol data unit uses the information included in the PHY midamble to estimate the communication channel (or update a previous channel estimate) to facilitate processing of a latter portion the single PHY protocol data unit. In various embodiments described below, wireless network interface devices determine a number of PHY midambles to be included in a PHY protocol data unit that is to be transmitted, or a number of PHY midambles that are included in a received PHY data unit.

Transmission and reception of data units including PHY midambles, as described below, are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, rate adaptation techniques are utilized in other types of wireless communication systems such as personal area networks (PANs), mobile communication networks such as cellular networks, metropolitan area networks (MANs), satellite communication networks, etc.

Figure 1:
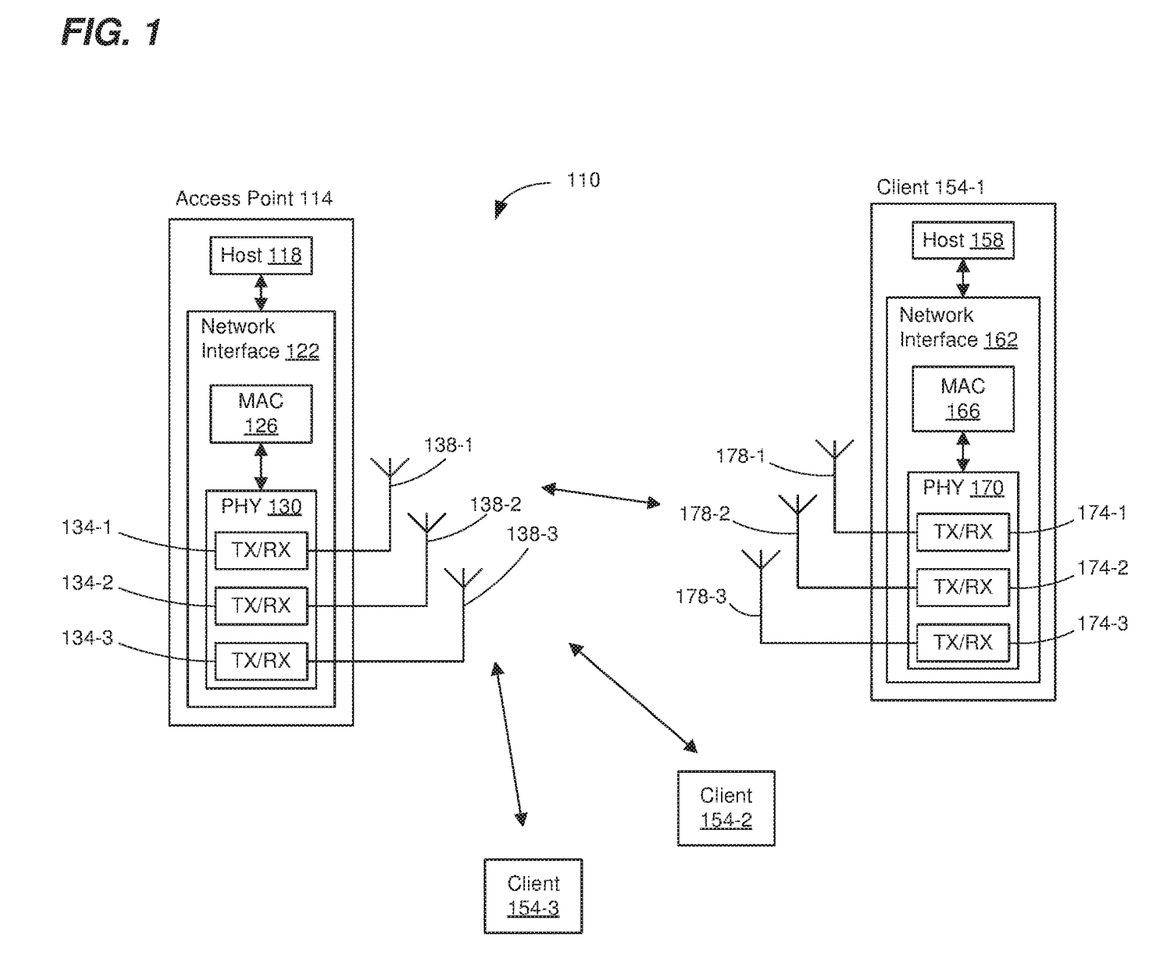
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface device 122 includes a medium access control (MAC) processor 126 and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network interface device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard, a future version of the IEEE 802.11 Standard, or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PPDUs such as PHY protocol data units (PPDUs) for transmission via the antennas 138. Generating PHY protocol data units includes generating PHY preambles and PHY midambles of the PHY protocol data units, at least in some embodiments. Similarly, the PHY processor 130 may be configured to receive PPDUs that were received via the antennas 138, and extract MAC layer data units encapsulated within the PPDUs. The PHY processor 130 is configured to process PHY preambles and PHY midambles of the PHY protocol data units to perform functions such as one or more of synchronization, automatic gain control (AGC) adjustment, channel estimation, etc., at least in some embodiments. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 1544 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network interface device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PPDUs such as PPDUs for transmission via the antennas 178. Generating PHY protocol data units includes generating PHY preambles and PHY midambles of the PHY protocol data units, at least in some embodiments. Similarly, the PHY processor 170 may be configured to receive PPDUs that were received via the antennas 178, and extract MAC layer data units encapsulated within the PPDUs. The PHY processor 170 is configured to process PHY preambles and PHY midambles of the PHY protocol data units to perform functions such as one or more of synchronization, AGC adjustment, channel estimation, etc., at least in some embodiments. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2:
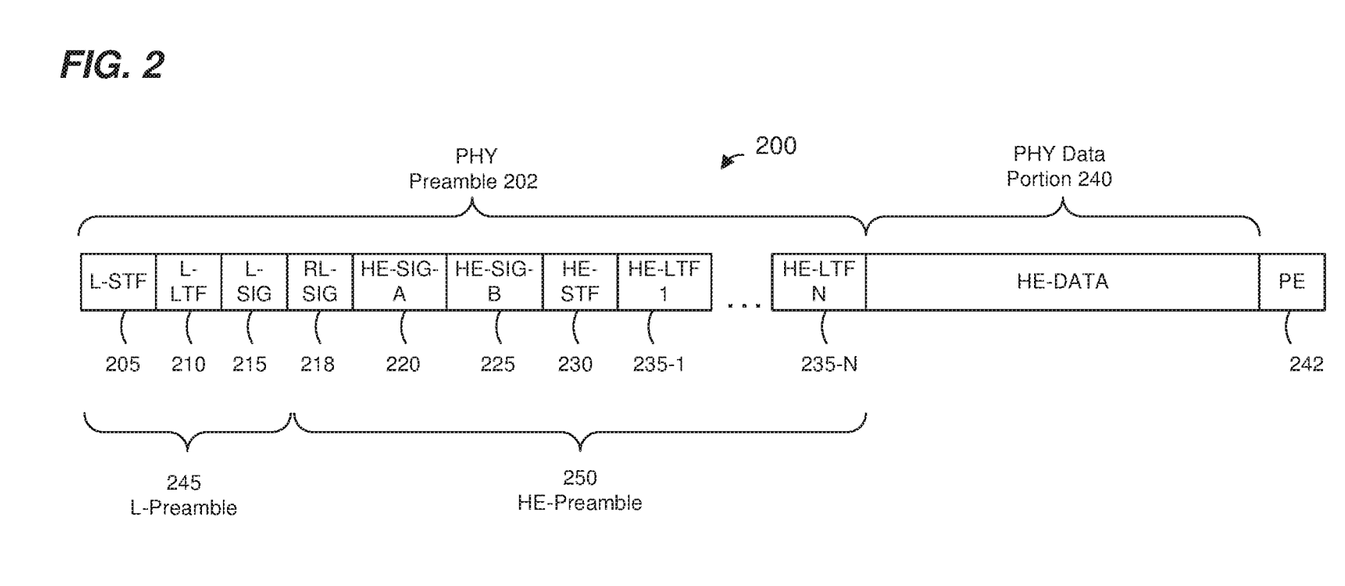
FIG. 2 is a diagram of an example physical layer (PHY) protocol data unit, according an embodiment.

FIG. 2 is a diagram of a PPDU 200 that the network interface device 122 (FIG. 1) is configured to generate and transmit to one or more client stations 154, according to an embodiment. The network interface device 162 (FIG. 1) may also be configured to transmit PPDUs the same as or similar to the PPDU 200 to the AP 114. The PPDU 200 may occupy a 20 MHz bandwidth or another suitable bandwidth. PPDUs similar to the PPDU 200 occupy other suitable bandwidth such as 40 MHz, 80 MHz, 160 MHz, 320 MHz, 640 MHz, for example, or other suitable bandwidths, in other embodiments.

The PPDU 200 includes a PHY preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal-A field (HE-SIG-A) 220, an HE signal-B field (HE-SIG-B) 225, an HE short training field (HE-STF) 230, and N HE long training fields (HE-LTFs) 235, where N is a suitable positive integer. In an embodiment, N generally corresponds to (e.g., is greater than or equal to) a number of spatial streams via which the PPDU 200 will be transmitted. A legacy preamble portion 245 of the preamble 202 includes the L-STF 205, L-LTF 210 and L-SIG 215. An HE preamble portion 250 of the preamble 202 includes the RL-SIG 218, the HE-SIG-A 220, the HE-SIG-B 225, the HE-STF 230 and the N HE-LTFs 235. The PPDU 200 also includes a PHY data portion 240 and a packet extension (PE) field 242. The PHY data portion 240 includes one or more MPDUs, MSDUs, an aggregate MPDU (A-MPDU), etc. In some scenarios, the PPDU 200 may omit the PHY data portion 240. In some embodiments, the PPDU 200 may omit one or more fields corresponding to the preamble 202. In some embodiments, the preamble 202 includes additional fields not illustrated in FIG. 2.

Each of the L-STF 205, the L-LTF 210, the L-SIG 215, the RL-SIG 218, the HE-SIG-A 220, the HE-SIG-B 225, the HE-STF 230, the N HE-LTFs 235, and the data portion 240 comprises one or more orthogonal frequency division multiplexing (OFDM) symbols. As merely an illustrative example, the HE-SIG-A 220 comprises two OFDM symbols. As another example, each HE-LTF 235 comprises a single OFDM symbol.

In the illustration of FIG. 2, the PPDU 200 includes one of each of the L-STF 205, the L-LTF 210, the L-SIG 215, the RL-SIG 218 and the HE-SIG-A 220. In some embodiments in which a PPDU similar to the PPDU 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the PPDU, in an embodiment. For example, in an embodiment in which the PPDU occupies an 80 MHz bandwidth, the PPDU 200 includes four of each of the L-STF 205, the L-LTF 210, the L-SIG 215, the RL-SIG 218, and the HE-SIG-A 220.

In an embodiment, the HE-SIG-A 220 generally carries information about the format of the PPDU 200, such as information needed to properly decode at least a portion of the PPDU 200, in an embodiment. In some embodiments, HE-SIG-A 220 additionally includes information for receivers that are not intended receivers of the PPDU 200, such as information needed for medium protection, spatial reuse, etc. In an embodiment where the PPDU 200 is a single user (SU) PPDU transmitted to/from a single client station, the PPDU 200 does not include an HE-SIG-B field 225.

In an embodiment, the PPDU 200 is a multi-user (MU) PHY data unit that utilizes orthogonal frequency division multiple access (OFDMA) modulation in which independent data streams are transmitted to/from multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to transmissions to one or more client stations 154.

In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO data unit in which independent data streams are transmitted to/from multiple client stations 154 using respective spatial streams, allocated to the client stations 154.

In an embodiment, the HE-SIG-B 225 is present when the PPDU 200 is an MU data unit (e.g. OFDMA data unit, MU-MIMO data unit). In an embodiment, the HE-SIGB 224 indicates RU and/or spatial stream allocation configuration for multiple client stations 154.

The PE field 242 is optionally appended to the end of the PPDU 200 to provide a receiver device with additional processing time at the end of reception of the PPDU 200.

Packets (e.g., the PPDU 200) generated by communication devices such as the network interface device 122 and/or the network interface device 162 sometimes include both a PHY preamble (e.g., the preamble 202) and one or more PHY midambles to allow a receiving device to update channel estimation, adjust synchronization, during reception of a single packet. For example, if the packet is very long (e.g., greater than 65,535 octets), in situations such as when a channel is particularly noisy, in situations such as when relative movement between a transmitting device and a receiving device causes a Doppler effect, and/or in situations such as when movement of objects in the environment cause a Doppler effect, etc., refining a channel estimate and/or synchronization more than once during the reception of a single packet unit may be beneficial. A transmitting device generates the PHY preamble and one or more PHY midambles so as to allow a receiving device to estimate a communication channel between the transmitting device and the receiving device and/or to refine synchronization during reception of the packet, and accordingly demodulate a data payload of the packet. In an embodiment, each PHY midamble includes fields that are identical (e.g., formatted, encoded, modulated, etc., in a manner that is identical) to the HE-LTF fields 235.

Accordingly, one or more PHY midambles are included within a data portion (such as the data portion 240) of the packet, e.g., each PHY midamble is adjacent to data from the payload at both a beginning of the PHY midamble and an end of the PHY midamble. Each PHY midamble includes one or more OFDM symbols that include training information (sometimes referred to as calibration information), at least a portion of which may be used for one or more of retraining channel training or estimation, refining frequency synchronization or carrier frequency offset (CFO) adjustment, calculating a steering matrix or other parameters used in beamforming, adapting to a communication link, AGC adjustment, etc. Embodiments of PHY midambles described herein may have particular applicability to communication systems in which a packet duration is longer than durations of channel coherence, such as in wireless systems that use shorter wavelengths, and/or in communication systems that experience a Doppler effect.

Figure 3A:
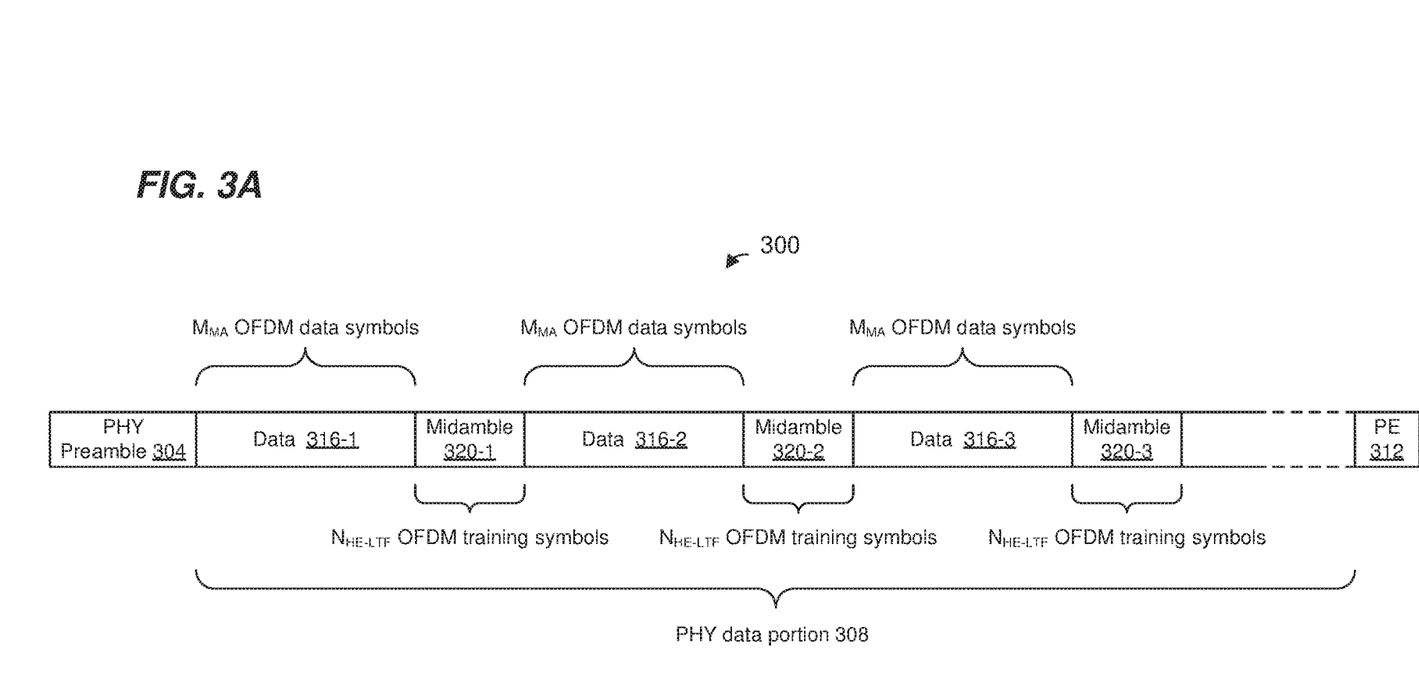
FIG. 3A is a diagram of an example PHY protocol data unit having PHY midambles, according to an embodiment.

FIG. 3A is a diagram of an example PPDU 300, according to an embodiment. In an embodiment, the network interface device 122 (FIG. 1) is configured to generate and transmit the PPDU 300, and the network interface device 162 (FIG. 1) is configured to receive and process the PPDU 300. In sonic embodiments, the network interface device 162 (FIG. 1) is configured to generate and transmit the PPDU 300, and the network interface device 122 (FIG. 1) is configured to receive and process the PPDU 300. The PPDU 300 may occupy a 20 MHz bandwidth or another suitable bandwidth. Data units similar to the PPDU 300 occupy other suitable bandwidth such as 1 MHz, 2 MHz, 5 MHz, 10 MHz, 40 MHz, 80 MHz, 160 MHz, 320 MHz, 640 MHz, for example, or other suitable bandwidths, in other embodiments.

The PPDU 300 includes a PHY preamble 304, a PHY data portion 308, and a PE field 312. In an embodiment, elements of the PPDU 300 is similar to the PPDU 200 described above with reference to FIG. 2, and the preamble 304 corresponds to the preamble 202, and the PE field 312 corresponds to the PE field 242.

The PHY data portion 308 includes a data payload comprising a plurality of OFDM data symbols partitioned into a plurality of data portions 316, between which are located one or more PHY midambles 320. A number of OFDM data symbols, in the data portion 316, between two consecutive PHY midambles 320 is referred to herein as a midamble periodicity $M_{MA}$. Within the PHY data portion 308, a PHY midamble 320 is inserted after every $M_{MA}$ OFDM data symbols. In an embodiment, $M_{MA}$ is a suitable positive integer, such as 10, 20, etc., or some other suitable positive integer that is not a multiple of 10. In an embodiment, each PHY midamble 320 includes one or more OFDM symbols. In an embodiment, each PHY midamble 320 includes HE-LTF fields that are identical to, or similar to, the HE-LTF fields 235 included in the PHY preamble 304. In an embodiment, each PHY midamble 320 includes 1, 2, or 4 HE-LTF symbols. In another embodiment, however, each PHY midamble additionally or alternatively includes training fields that are different from the HE-LTF fields 235 included in the PHY preamble 304, and/or includes a different suitable number of HE-LTF symbols.

In an embodiment, a signal field of the PPDU 300 (e.g., an HE-SIG-A field included in the PHY preamble 304) includes a field that indicates the midamble periodicity $M_{MA}$ corresponding to the PPDU 300. In another embodiment, the PPDU 300 is transmitted by a communication device in response to a received trigger frame that was transmitted by another communication device; and the trigger frame includes a field that indicates the midamble periodicity $M_{MA}$ that should be used to generate the PPDU 300 that is solicited by the trigger frame.

In some embodiments, $M_{MA}$ is defined by a communication protocol. In some embodiments, the communication protocol defines a set of multiple values from which $M_{MA}$ can be chosen. In an embodiment, the set of multiple values from which $M_{MA}$ can be chosen is {10, 20}. In other embodiments, the set of multiple values from which $M_{MA}$ includes more than 2 values and/or includes suitable values that are not multiples of 10. In some embodiments, the communication protocol defines different values, or sets of possible values, of $M_{MA}$ for different applications and/or different modes of operation. In some embodiments, the network interface device 122/162 chooses $M_{MA}$ based on channel conditions (e.g., a rate of variation of the communication channel over time) and indicates $M_{MA}$ in a subfield of a signal field of the PPDU 300 or a trigger frame soliciting the PPDU 300.

Although an identical number of the data portions 316 and the PHY midambles 320 are illustrated in the PPDU 300, in another embodiment, a number of data portions 316 and a number of PHY midambles 320 are different from each other. For instance, in an embodiment, the number of PHY midambles 320 is one less than the number of data portions 316.

Figure 3B:
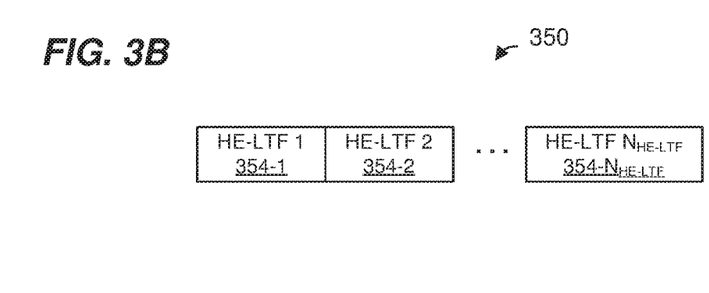
FIG. 3B is a diagram of an example PHY midamble of the PHY protocol data unit of FIG. 3A, according to an embodiment.

FIG. 3B is a diagram of an example PHY midamble 350 that is included in the PPDU 300 of FIG. 3A (e.g., each PHY midamble 320 includes the PHY midamble 350), according to an embodiment.

The PHY midamble 350 comprises $N_{HE-LTF}$ HE-LTFs 354, where $N_{HE-LTF}$ is a suitable positive integer. In an embodiment, $N_{HE-LTF}$ generally corresponds to (e.g., is greater than or equal to) a number of spatial streams ($N_{STS}$) via which the PPDU 300 will be transmitted. In an embodiment, the number of HE-LTFs 354 in the PHY midamble 350 is equal to the number of HE-LTFs 235 in the PHY preamble (e.g., the PHY preamble 202 or the PHY preamble 304).

In various embodiments described below, unless otherwise specified, the term "communication device" may refer to either of the AP 114 (or the network interface device 122 therein) or the client station 154 (or the network interface device 162 therein).

In an embodiment, when a communication device is to transmit a PPDU 300, the communication device determines a transmit time (TXTIME) corresponding to the PPDU 300 according to:

$$\text{TXTIME (in µs)} = 20 + T_{HE-PREAMBLE} + N_{SYM}T_{SYM} + N_{MA}N_{HE-LTF}T_{HE-LTF} + T_{PE} + \text{SignalExtension} \quad \text{Equation 1}$$

where $T_{HE-PREAMBLE}$ is a time duration of an HE-Preamble in the PHY preamble 304, $N_{SYM}$ is a total number of the OFDM data symbols in the PHY data portion 308, $T_{SYM}$ is a time duration of an OFDM data symbol, $N_{MA}$ is a number of PHY midambles 320 in the PPDU 300, $N_{HE-LTF}$ is a number of HE-LTE OFDM training symbols in each PHY midamble 320, $T_{HE-LTF}$ is a time duration of each HE-LTF OFDM training symbol in each PHY midamble 320, $T_{PE}$ is a duration of the PE field 312, and SignalExtension is a time duration corresponding to a period of no signal transmission at the end of the PPDU 300. The values of at least some of the parameters used for calculating TXTIME are defined by the communication protocol and/or correspond to a particular format of the PPDU 300 being transmitted.

In an embodiment, a communication device transmitting the PPDU 300 determines the number of PHY midambles 320 (i.e., $N_{MA}$) to be included in the PPDU 300 according to:

$$N_{MA} = \left\lceil \frac{N_{SYM}}{M_{MA}} \right\rceil - 1 \quad \text{Equation 2}$$

where $\lceil \ \rceil$ represents a ceiling function. In an embodiment, the ceiling function corresponds to a smallest integer that is greater than or equal to an argument of the ceiling function. In one such embodiment, Equation 2 results in the transmitting communication device not including a PHY midamble after a last OFDM data symbol in the PHY data portion 308 if $\text{mod}(N_{SYM}, M_{MA})=0$. This may result in a more efficient transmission of the PPDU 300 by reducing the transmission time of the PPDU 300, in at least some situations.

In another embodiment, a communication device transmitting the PPDU 300 determines the number of PHY midambles 320 to be included in the PPDU 300 according to:

$$N_{MA} = \left\lfloor \frac{N_{SYM}}{M_{MA}} \right\rfloor \quad \text{Equation 3}$$

where $\lfloor \ \rfloor$ represents a floor function. In an embodiment, the floor function corresponds to a largest integer that is less than or equal to an argument of the floor function. In one such embodiment, Equation 3 results in the transmitting communication device including a PHY midamble after a last OFDM data symbol in the PHY data portion 308 even if $\text{mod}(N_{SYM}, M_{MA})=0$.

In another embodiment, a communication device transmitting the PPDU 300 determines the number of PHY midambles 320 to be included in the PPDU 300 according to:

$$N_{MA} = \max\left(0, \left\lceil \frac{N_{SYM} - \beta + 1}{M_{MA}} \right\rceil - 1\right) \quad \text{Equation 4}$$

where $\beta$ is a number that that is smaller than $M_{MA}$. As merely an illustrative example, $\beta$ is equal to 2. In other embodiments, $\beta$ may be equal to another suitable integer value (e.g., 1, 3, 4, etc.).

In an embodiment, determination of $N_{MA}$ according to Equation 4 results in the communication device determining that a further PHY midamble will be included in the PHY data portion 308 when a remaining number of OFDM data symbols in the PHY data portion 308 is greater than or equal to $M_{MA}+\beta$. Further, determination of $N_{MA}$ according to Equation 4 results in the communication device determining that a further PHY midamble will not be included in the PHY data portion 308 when a remaining number of OFDM data symbols in the PHY data portion 308 is less than $M_{MA}+\beta$. In other words, Equation 4 results in the communication device not including a PHY midamble before a last $\text{mod}(N_{SYM}, M_{MA})$ OFDM data symbol(s) in the PHY data portion 308 if $\text{mod}(N_{SYM}, M_{MA}) \leq \beta-1$. For instance, if $\beta$ is equal to 2 and $\text{mod}(N_{SYM}, M_{MA})$ is determined to be equal to 1, the communication device does not include a PHY midamble before a last OFDM data symbol in the PHY data portion 308.

Based on the determined $N_{MA}$ according to one of Equations 2-4 (or according to another suitable technique), a communication device transmitting the PPDU 300 determines TXTIME. In an embodiment, a communication device transmitting the PPDU 300 further determines a length parameter (LENGTH) based on the determined TXTIME. In an embodiment, LENGTH is determined according to:

$$\text{LENGTH} = \left\lceil \frac{\text{TXTIME} - \text{SignalExtension} - 20}{4} \right\rceil \times 3 - 3 - m \quad \text{Equation 5}$$

where m is set to 1 or 2 based on the format of the PPDU 300. For instance, m is set to 1 when the PPDU 300 is an MU PPDU, and set to 2 when the PPDU 300 is an SU PPDU. The determined LENGTH value is indicated in a signal field in the PHY preamble 304 of the transmitted PPDU 300 (e.g., in the L-SIG field 215 (FIG. 2) or in another suitable field in the PHY preamble 304).

A communication device receiving the PPDU 300 determines a reception time (RXTIME) in order to set its PHY receive state machine, e.g., for channel access procedures. For instance, in an embodiment, if the PPDU 300 is not addressed to the receiving communication device, the receiving communication device assesses the communication channel corresponding to the PPDU 300 as busy for a duration corresponding to RXTIME and refrains from any transmission for the duration. In another embodiment, if the receiving communication device encounters an error (e.g., cyclic redundancy check (CRC) error, carrier loss, invalid/unsupported format, etc.) while decoding the PHY data portion 308, the receiving communication device waits for a duration corresponding to at least RXTIME prior to initiating any further communication. In an embodiment, the communication device determines RXTIME according to:

$$\text{RXTIME (in } \mu s) = 20 + T_{HE\text{-}PREAMBLE} + N_{SYM}T_{SYM} + N_{MA}N_{HE\text{-}LTF}T_{HE\text{-}LTF} + T_{PE} + \text{SignalExtension} \quad \text{Equation 6}$$

At least some of the parameters used for calculating RXTIME are predefined (e.g., based on the format of the PPDU 300 and/or defined by the communication protocol) and/or signaled in a field of the PHY preamble of the PPDU 300. In an embodiment, $T_{HE\text{-}PREAMBLE}$ is set according to the communication protocol and/or the format of the PPDU 300 (e.g., SU, MU, etc.) being received. In an embodiment, parameters $T_{SYM}$, $N_{HE\text{-}LTF}$, and $T_{HE\text{-}LTF}$ are set according to indications in a signal field of the PHY preamble 304 (e.g., one or more of the L-SIG field 215, the HE-SIG-A field 220, the HE SIG-B field 225, etc.). SignalExtension is set according to an operating frequency band of the communication device, in an embodiment. The following paragraphs describe various methods for determining $N_{MA}$, $N_{SYM}$, and $T_{PE}$ corresponding to the received PPDU 300.

A communication device receiving the PPDU 300 retrieves i) the LENGTH value corresponding to the PPDU 300 from the L-SIG field 215 (or from another suitable field) in the PHY preamble 304 of the PPDU 300, and ii) the midamble periodicity $M_{MA}$ from the HE-SIG-A field 220 (or from another suitable field) in the PHY preamble 304 of the PPDU 300. Using the retrieved parameters (e.g., LENGTH and $M_{MA}$), the communication device determines the number of PHY midambles 320 ($N_{MA}$) in the received PPDU 300.

In an embodiment, a communication device receiving the PPDU 300 determines a parameter $T_{rem}$ according to:

$$T_{rem} = \mod = \left( \frac{LENGTH+3+m}{3} \times 4 - T_{HE\text{-}PREAMBLE} - b_{PE\text{-}Disambiguity}T_{SYM}, T_{MA} \right) \quad \text{Equation 7}$$

where $b_{PE\text{-}Disambiguity}$ is a parameter corresponding to the PE duration of the PPDU 300, m is set to 1 or 2 based on the format of the PPDU 300 (as discussed above), and $T_{MA}$ is a time period between neighboring PHY midambles 320 (which can be determined, for instance, based on $M_{MA}$, $T_{SYM}$, $T_{HE\text{-}LTF}$, and $N_{HE\text{-}LTF}$). In an embodiment, the $b_{PE\text{-}Disambiguity}$ parameter provides information regarding the PE field. In an embodiment, $b_{PE\text{-}Disambiguity}$ is included in an HE-SIG field (e.g., an HE-SIG-A field) in the PHY preamble 304 of the received PPDU 300. In an embodiment, $T_{MA}$ is determined according to:

$$T_{MA} = M_{MA}T_{SYM} + N_{HE\text{-}LTF}T_{HE\text{-}LTF} \quad \text{Equation 8}$$

The parameter $T_{rem}$ is checked for the following conditions: $0 < T_{rem} < T_{SYM}$ and $0 < T_{rem} < T_{SYM} - N_{HE\text{-}LTF}T_{HE\text{-}LTF}$. If either of the conditions is determined to be true, the communication device receiving the PPDU 300 determines $N_{MA}$ corresponding to the received PPDU 300 according to:

$$N_{MA} = \left\lfloor \left( \frac{LENGTH+3+m}{3} \times 4 - T_{HE\text{-}PREAMBLE} - b_{PE\text{-}Disambiguity}T_{SYM} \right) \Big/ T_{MA} \right\rfloor - 1 \quad \text{Equation 9}$$

If both the above conditions are determined to be false, the communication device determines $N_{MA}$ corresponding to the received PPDU 300 according to:

$$N_{MA} = \left\lfloor \left( \frac{LENGTH+3+m}{3} \times 4 - T_{HE\text{-}PREAMBLE} - b_{PE\text{-}Disambiguity}T_{SYM} \right) \Big/ T_{MA} \right\rfloor - 1 \quad \text{Equation 10}$$

In an embodiment, the communication device receiving the PPDU 300 determines $N_{MA}$ according to Equations 7-10 when a communication device that transmits the PPDU 300 determines the number of PHY midambles 320 to be included in the PPDU 300 according to Equation 2. In another embodiment, the communication device receiving the PPDU 300 determines $N_{MA}$ according to Equations 8 and 10 (e.g., without determining $T_{rem}$ and checking for the above-discussed conditions) when a communication device that transmits the PPDU 300 determines the number of PHY midambles 320 to be included in the PPDU 300 according to Equation 3. Therefore, in at least embodiments in which a transmitting communication device utilizes Equation 3, the determination of $N_{MA}$ at the receiving communication device is simplified.

In another embodiment, the receiving communication device determines $N_{MA}$ corresponding to the received PPDU 300 according to:

$$N_{MA} = \left\lfloor \left( \frac{LENGTH+3+m}{3} \times 4 - T_{HE\text{-}PREAMBLE} - \psi T_{SYM} \right) \Big/ T_{MA} \right\rfloor - 1 \quad \text{Equation 11}$$

$$\text{where } \psi = \begin{cases} 1 & b_{PE\text{-}Disambiguity} = 1 \\ 0.9375 & b_{PE\text{-}Disambiguity} = 0 \end{cases}$$

In an embodiment, the communication device receiving the PPDU 300 determines $N_{MA}$ according to Equations 8 and 11 when a communication device that transmits the PPDU 300 determines the number of PHY midambles 320 to be included in the PPDU 300 according to Equation 2.

In another embodiment, the receiving communication device determines $N_{MA}$ corresponding to the received PPDU 300 according to:

$$N_{MA} = \max\left(0, \left\lfloor \left( \frac{LENGTH+3+m}{3} \times 4 - T_{HE\text{-}PREAMBLE} - (b_{PE\text{-}Disambiguity} + \beta)T_{SYM} \right) \Big/ T_{MA} \right\rfloor \right) \quad \text{Equation 12}$$

In an embodiment, the receiving communication device determines $N_{MA}$ according to Equations 8 and 12 when a communication device that transmits the PPDU 300 determines the number of PHY midambles 320 to be included in the PPDU 300 according to Equation 4.

In an embodiment, the terms $$\left(\frac{LENGTH+3+m}{3} \times 4 - T_{HE\text{-}PREAMBLE} - b_{PE\text{-}Disambiguity}T_{SYM}\right),$$

$$\left(\frac{LENGTH+3+m}{3} \times 4 - T_{HE\text{-}PREAMBLE} - \psi T_{SYM}\right), \text{ and}$$

$$\left(\frac{LENGTH+3+m}{3} \times 4 - T_{HE\text{-}PREAMBLE} - (b_{PE\text{-}Disambiguity} + \beta)T_{SYM}\right),$$

as employed in Equations 9-12, correspond to estimates of a duration of the PHY data portion 308 in the received PPDU 300.

The communication device determines $N_{SYM}$ and $T_{PE}$ corresponding to the received PPDU 300 based on the determined $N_{MA}$ as described above with reference to Equations 7-12. In an embodiment, $N_{SYM}$ is calculated according to:

$$N_{SYM} = \left\lceil \left(\frac{LENGTH+3+m}{3} \times 4 - T_{HE\text{-}PREAMBLE} - N_{MA}N_{HE\text{-}LTF}T_{HE\text{-}LTF}\right) \middle/ T_{SYM}\right\rceil - b_{PE\text{-}Disambiguity} \quad \text{Equation 13}$$

$T_{PE}$ is calculated according to:

$$T_{PE} = \left\lceil \frac{\left(\frac{LENGTH+3+m}{3} \times 4 - T_{HE\text{-}PREAMBLE}\right) - N_{SYM}T_{SYM} - N_{MA}N_{HE\text{-}LTF}T_{HE\text{-}LTF}}{4} \right\rceil \times 4 \quad \text{Equation 14}$$

Based on the determined $N_{MA}$, $N_{SYM}$, and $T_{PE}$ corresponding to the received PPDU 300, the communication device calculates RXTIME according to Equation 6.

In another embodiment, the PPDU 300 is a trigger based (TB) PPDU transmitted by a communication device in response in response to a trigger frame. For instance, in an embodiment, the network interface device 162 transmits the PPDU 300 in response to receiving a trigger frame transmitted by the network interface device 122. The trigger frame includes parameters corresponding to a length (LENGTH) of the solicited PPDU 300 and a midamble periodicity ($M_{MA}$) of the solicited PPDU 300. Other parameters such as $N_{HE\text{-}LTF}$, $T_{HE\text{-}LTF}$, $T_{SYM}$, and $b_{PE\text{-}Disambiguity}$ corresponding to the solicited PPDU 300 are also determined according to one or more indicators in the trigger frame. The communication device transmitting the PPDU 300 in response to the trigger frame determines a number of PHY midambles 320 ($N_{MA}$) to be included in the solicited PPDU 300 based on the above parameters signaled in the trigger frame.

In an embodiment, a communication device that is to generate and transmit the solicited PPDU 300 responsive to a trigger frame first determines a parameter $T_{rem}$ according to Equations 7 and 8 using LENGTH, $M_{MA}$, and $b_{PE\text{-}Disambiguity}$ parameters derived from the trigger frame, and m set to a value corresponding to a TB PPDU (e.g., 2). The parameter $T_{rem}$ is checked for the following conditions: $0<T_{rem}<T_{SYM}$ and $0<T_{rem}<T_{SYM}-N_{HE\text{-}LTF}T_{HE\text{-}LTF}$. If either of the conditions is determined to be true, the communication device determines $N_{MA}$ to be included in the PHY data portion 308 of the solicited PPDU 300 according to Equation 9. If both the above conditions are determined to be false, the communication device determines $N_{MA}$ to be included in the PHY data portion 308 of the solicited PPDU 300 according to Equation 10.

In other embodiments, the communication device determines $N_{MA}$ for the solicited PPDU 300 according to Equations 8 and 10 without checking for the above conditions. In other embodiments, the communication device determines $N_{MA}$ for the solicited PPDU 300 according to Equations 8 and 11 without checking for the above conditions.

Following the determination of $N_{MA}$, the communication device determines $N_{SYM}$ and $T_{PE}$ corresponding to the solicited PPDU 300. In an embodiment, the communication device determines $N_{SYM}$ and $T_{PE}$ according to Equations 13 and 14.

Figure 4:
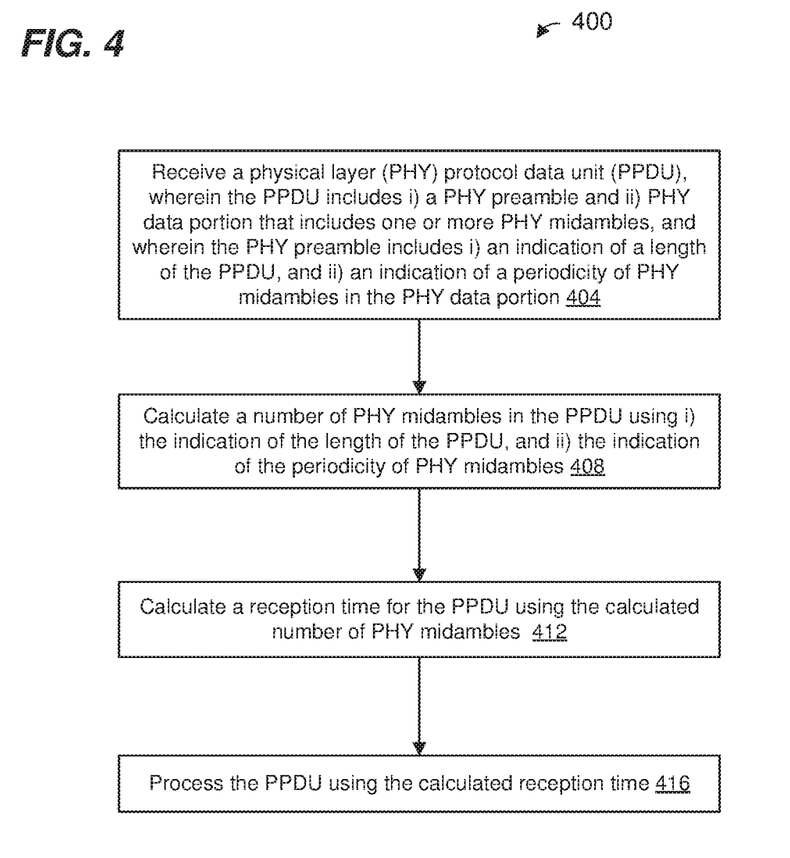
FIG. 4 is a flow diagram of an example method for processing a PHY protocol data unit such as the PHY protocol data unit of FIG. 3, according to an embodiment.

FIG. 4 is a flow diagram of an example method 400 for processing a PPDU, according to an embodiment. With reference to FIG. 1, the method 400 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 400. According to another embodiment, a MAC processor such as the MAC processor 126 or the MAC processor 166 is also configured to implement a portion of the method 400.

The method 400 is described with reference to FIG. 1 merely for explanatory purposes. In other embodiments, the method 400 is implemented by another suitable communication device different than the communication devices of FIG. 1.

At block 404, a communication device receives (e.g., the AP 114 receives, the client station 154 receives, the network interface device 122 receives, the network interface device 162 receives, the PHY processor 130 receives, the PHY processor 170 receives, etc.) a PPDU. In an embodiment, the PPDU includes i) a PHY preamble and ii) PHY data portion that includes one or more PHY midambles. In an embodiment, the PHY preamble includes i) an indication of a length of the PPDU, and ii) an indication of a periodicity of PHY midambles in the PHY data portion. In an embodiment, the received PPDU is formatted in a manner similar to the PPDU 300 with the indication of the length (e.g., LENGTH) of the PPDU included in an L-SIG field 215 and the indication of the periodicity of PHY midambles (e.g., $M_{MA}$) included in the HE-SIG-A field 220. In other embodiments, the indication of the length of the PPDU is included in another suitable field of the PHY preamble, and/or and the indication of the periodicity of PHY midambles is included in another suitable field of the PHY preamble.

At block 408, the communication device calculates (e.g., the AP 114 calculates, the client station 154 calculates, the network interface device 122 calculates, the network interface device 162 calculates, the PHY processor 130 calculates, the PHY processor 170 calculates, the MAC processor 126 calculates, the MAC processor 166 calculates, etc.) a number of PHY midambles (e.g., $N_{MA}$) in the received PPDU using i) the indication of the length of the PPDU, and ii) the indication of the periodicity of PHY midambles. In various embodiments, the communication device calculates the number of PHY midambles in the received PPDU according to one or more of the Equations 9-12. In an embodiment, the equation to be used is defined by a communication protocol.

At block 412, the communication device calculates the AP 114 calculates, the client station 154 calculates, the network interface device 122 calculates, the network interface device 162 calculates, the PHY processor 130 calculates, the PHY processor 170 calculates, the MAC processor 126 calculates, the MAC processor 166 calculates, etc.) a reception time (e.g., RXTIME) for the PPDU using the calculated number of PHY midambles. In an embodiment, the communication calculates the reception time further using other communication parameters determined based on a communication protocol corresponding to the received PPDU and/or included in a field (e.g., a signal field) in the PHY preamble of the PPDU. In an embodiment, the communication device calculates the reception time according to Equation 6.

At block 416, the communication device processes (e.g., the AP 114 processes, the client station 154 processes, the network interface device 122 processes, the network interface device 162 processes, the PHY processor 130 processes, the PHY processor 170 processes, the MAC processor 126 processes, the MAC processor 166 processes, etc.) the PPDU using the calculated reception time. In an embodiment, the communication device uses the calculated reception time for various channel access and clear channel assessment (CCA) procedures.

Figure 5:
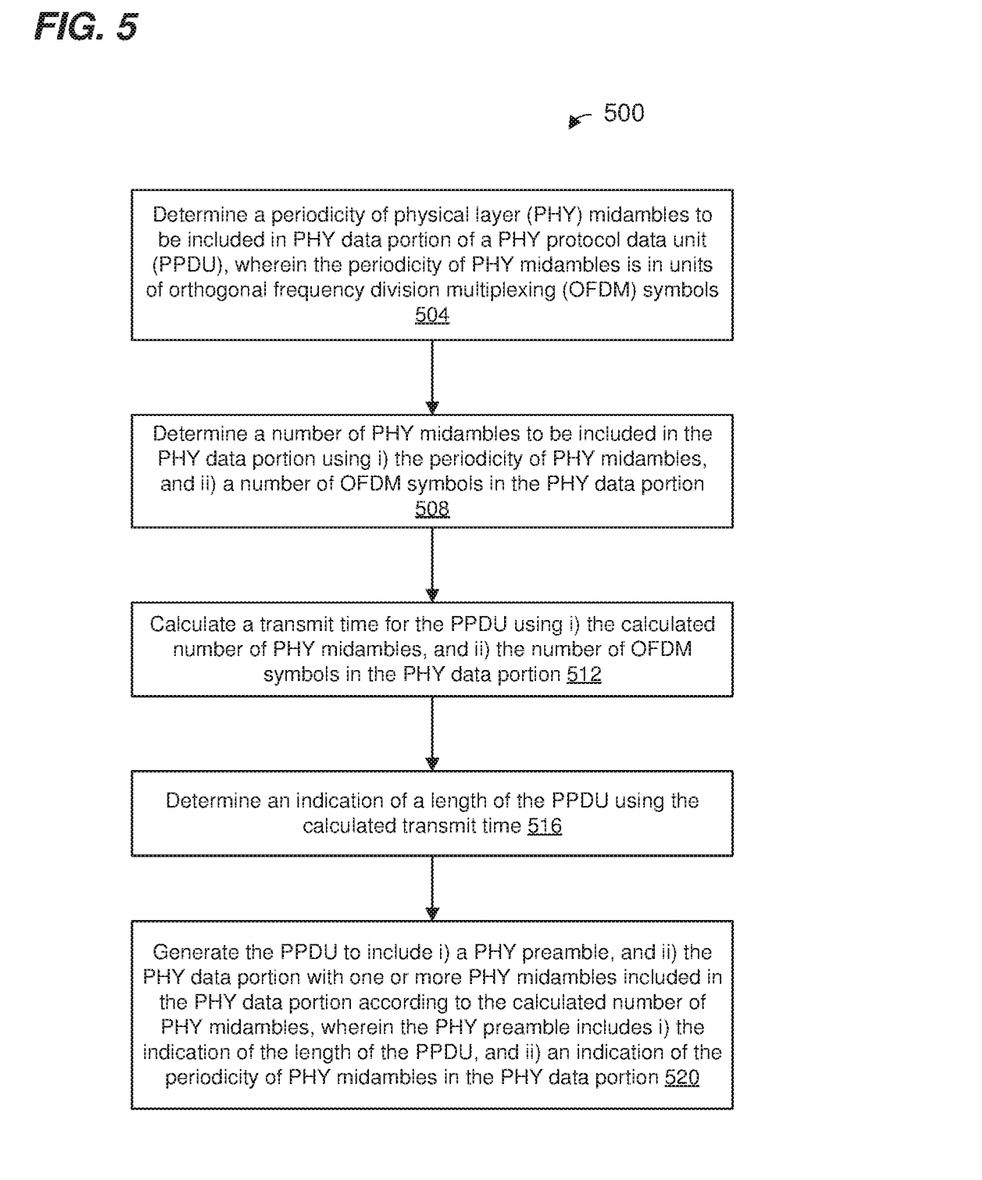
FIG. 5 is a flow diagram of an example method for generating a PHY protocol data unit such as the PHY protocol data unit of FIG. 3, according to an embodiment.

FIG. 5 is a flow diagram of an example method 500 for generating a PPDU, according to an embodiment. With reference to FIG. 1, the method 500 is implemented by a network interface device such as the network interface device 122 or the network interface device 162, in an embodiment. For example, in one such embodiment, a PHY processor such as the PHY processor 130 or the PHY processor 170 is configured to implement at least a portion of the method 500. According to another embodiment, a MAC processor such as the MAC processor 126 or the MAC processor 166 is also configured to implement a portion of the method 500.

The method 500 is described with reference to FIG. 1 merely for explanatory purposes. In other embodiments, the method 500 is implemented by another suitable communication device different than the communication devices of FIG. 1.

At block 504, a communication device determines (e.g., the network interface device 122 determines, the network interface device 162 determines, the PHY processor 130 determines, the PHY processor 170 determines, the MAC processor 126 determines, the MAC processor 166 determines, etc.) a periodicity of PHY midambles (e.g., $M_{MA}$) to be included in a PHY data portion of a PPDU. In an embodiment, the determined periodicity of PHY midambles is in units of OFDM symbols. For instance, in an embodiment, a communication protocol defines a set of multiple values (e.g., 10, 20, etc.) from which a particular $M_{MA}$ can be chosen.

At block 508, the communication device determines (e.g., the network interface device 122 determines, the network interface device 162 determines, the PHY processor 130 determines, the PHY processor 170 determines, the MAC processor 126 determines, the MAC processor 166 determines, etc.) a number of PHY midambles (e.g., $N_{MA}$) to be included in the PHY data portion using i) the determined periodicity of PHY midambles (e.g., $M_{MA}$), and ii) a number of OFDM data symbols in the PHY data portion (e.g., $N_{SYM}$). In various embodiments, $N_{MA}$ is determined according to any of the Equations 2-4. In an embodiment in which $N_{MA}$ is determined according to Equation 4, determining $N_{MA}$ includes determining that a further PHY midamble will be included in the PHY data portion when a number of OFDM data symbols remaining in the PHY data portion after a last PHY midamble is greater than or equal to a sum of i) $M_{MA}$, and ii) a positive integer (e.g., β), and determining that the further PHY midamble will not be included in the PHY data portion when the number of OFDM symbols remaining in the PHY data portion after the last PHY midamble is less than the sum of i) $M_{MA}$, and ii) the positive integer. In an embodiment, the positive integer (e.g., β) is a value that is less than $M_{MA}$.

At block 512, the communication device calculates (e.g., the network interface device 122 calculates, the network interface device 162 calculates, the PHY processor 130 calculates, the PHY processor 170 calculates, the MAC processor 126 calculates, the MAC processor 166 calculates, etc.) a transmit time (e.g., TXTIME) for the PPDU using i) the calculated $N_{MA}$, and ii) $N_{SYM}$. In an embodiment, the communication device calculates TXTIME further using other communication parameters determined based on a communication protocol and/or a format of the PPDU. In an embodiment, the communication device calculates TXTIME according to Equation 1.

At block 516, the communication device determines (e.g., the network interface device 122 determines, the network interface device 162 determines, the PHY processor 130 determines, the PHY processor 170 determines, the MAC processor 126 determines, the MAC processor 166 determines, etc.) an indication of a length of the PPDU using the calculated TXTIME. In an embodiment, the indication of the length corresponds to LENGTH as calculated according to Equation 5.

At block 520, the communication device generates (e.g., the network interface device 122 generates, the network interface device 162 generates, the PHY processor 130 generates, the PHY processor 170 generates, etc.) the PPDU to include i) a PHY preamble, and ii) the PHY data portion with one or more PHY midambles included in the PHY data portion according to the calculated number of PHY midambles. In an embodiment, block 520 includes generating the PHY preamble to include i) the indication of the length of the PPDU (e.g., LENGTH), and ii) an indication of the periodicity of PHY midambles in the PHY data portion (e.g., $M_{MA}$). In an embodiment, the PPDU generated at block 520 corresponds to the PPDU 300, where the indication of the length of the PPDU is included in the L-SIG field and the indication of the periodicity of PHY midambles in the PHY data portion is included in the HE-SIG-A field.

Figure 6:
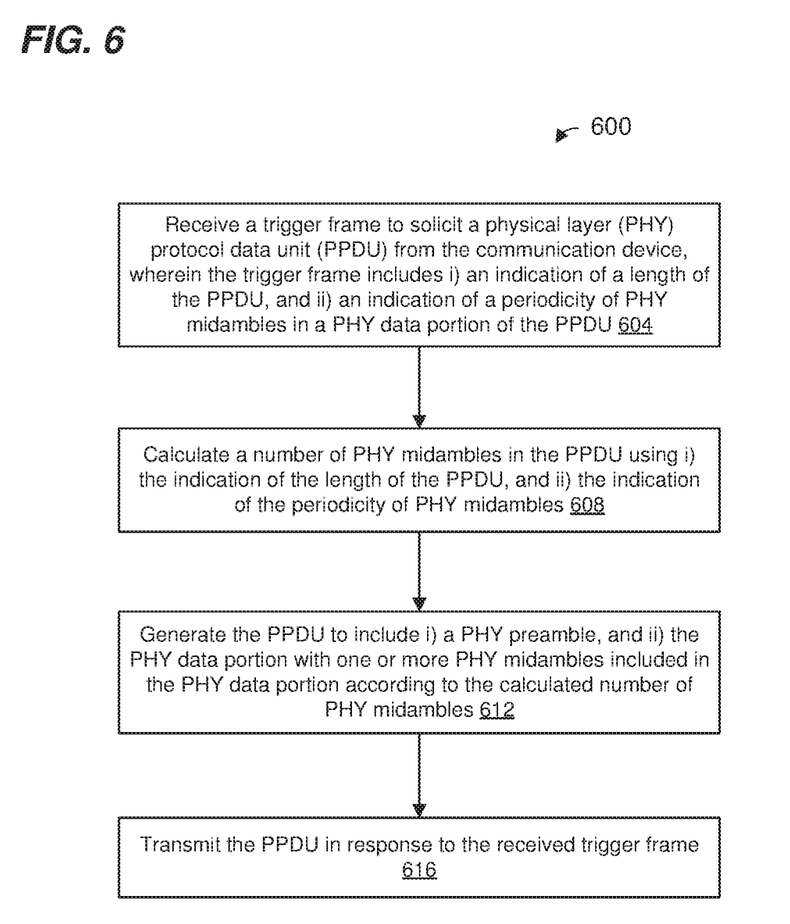
FIG. 6 is a flow diagram of another example method for generating a PHY protocol data unit such as the PHY protocol data unit of FIG. 3, according to an embodiment.

FIG. 6 is a flow diagram of an example method 600 for generating and transmitting a PPDU responsive to a trigger frame, according to an embodiment. With reference to FIG. 1, the method 600 is implemented by a network interface device such as the network interface device 162, in an embodiment. For example, in one such embodiment, the PHY processor 170 is configured to implement at least a portion of the method 600. According to another embodiment, the MAC processor 166 is also configured to implement a portion of the method 600.

The method 600 is described with reference to FIG. 1 merely for explanatory purpose. In other embodiments, the method 600 is implemented by another suitable communication device different than the communication devices of FIG. 1.

At block 604, a communication device receives (e.g., the network interface device 162 receives, the PHY processor 170 receives, etc.) a trigger frame that solicits a PPDU from the communication device. In an embodiment, the trigger frame includes i) an indication of a length of the PPDU (e.g., LENGTH) that is to be transmitted in response to the trigger frame, and ii) an indication of a periodicity of PHY midambles (e.g., $M_{MA}$) in a PHY data portion of the PPDU to be transmitted in response to the trigger frame.

At block 608, the communication device calculates (e.g., the network interface device 162 calculates, the PHY processor 170 calculates, the MAC processor 166 calculates, etc.) a number of PHY midambles (e.g., $N_{MA}$) to be included in the solicited PPDU using i) the indication of the length of the PPDU, and ii) the indication of the periodicity of PHY midambles. In an embodiment, the communication device calculates $N_{MA}$ for the solicited PPDU according to one or more of the Equations 7-12. In an embodiment, one or more of other parameters in the one or more of the Equations 7-12 are obtained using one or more values in fields included in the received trigger frame.

At block 612, the communication device generates (e.g., the network interface device 162 generates, the PHY processor 170 generates, etc.) generates the solicited PPDU to include i) a PHY preamble, and ii) the PHY data portion with one or more PHY midambles included in the PHY data portion according to the calculated $N_{MA}$ at block 608. In an embodiment, the PPDU corresponds to the PPDU 300 of FIG. 3.

At block 616, the communication device transmits (e.g., the PHY processor 170 transmits) the PPDU in response to the received trigger frame.

Embodiment 1: A method for wireless communication, the method comprising: receiving, at a communication device, a physical layer (PHY) protocol data unit (PPDU), wherein the PPDU includes i) a PHY preamble and ii) PHY data portion that includes one or more PHY midambles, and wherein the PHY preamble includes i) an indication of a length of the PPDU, and ii) an indication of a periodicity of PHY midambles in the PHY data portion; calculating, at the communication device, a number of PHY midambles in the PPDU using i) the indication of the length of the PPDU, and ii) the indication of the periodicity of PHY midambles; calculating, at the communication device, a reception time for the PPDU using the calculated number of PHY midambles, and processing, at the communication device, the PPDU using the calculated reception time.

Embodiment 2: The method of embodiment 1, wherein calculating the number of PHY midambles in the PPDU includes: calculating an estimate of a time duration of the PHY data portion using the indication of the length of the PPDU; calculating a time period between neighboring PHY midambles using the periodicity of PHY midambles; and calculating the number of PHY midambles in the PPDU using i) the estimate of the time duration of the PHY data portion, and ii) the calculated time period between neighboring PHY midambles.

Embodiment 3: The method of embodiment 2, wherein: the periodicity of PHY midambles is in units of orthogonal frequency division multiplexing (OFDM) symbols; and calculating the reception time for the PPDU includes: calculating a number of OFDM symbols in the PHY data portion excluding PHY midambles using i) the indication of the length of the PPDU, and ii) the calculated number of PHY midambles, and calculating the reception time for the PPDU further using the calculated number of OFDM symbols in the PHY data portion excluding PHY midambles.

Embodiment 4: The method of embodiment 3, wherein: the PPDU includes a packet extension field after the PHY data portion; calculating the reception time for the PPDU further includes: calculating a time period of the packet extension field using i) the indication of the length of the PPDU, ii) the calculated number of PHY midambles, and iii) the calculated number of OFDM symbols in the PHY data portion excluding PHY midambles, and calculating the reception time for the PPDU further using the calculated time period of the packet extension field.

Embodiment 5: The method of any of embodiments 1-4, wherein: the PHY preamble includes a bit providing information regarding a packet extension field after the PHY data portion; and calculating the number of PHY midambles in the PPDU further comprises using the bit providing information regarding the packet extension field after the PHY data portion.

Embodiment 6: An apparatus, comprising: a network interface device having one or more integrated circuit (IC) devices. The one or more IC devices are configured to: receive a physical layer (PHY) protocol data unit (PPDU), wherein the PPDU includes i) a PHY preamble and ii) PHY data portion that includes one or more PHY midambles, and wherein the PHY preamble includes i) an indication of a length of the PPDU, and ii) an indication of a periodicity of PHY midambles in the PHY data portion; calculate a number of PHY midambles in the PPDU using i) the indication of the length of the PPDU, and ii) the indication of the periodicity of PHY midambles; calculate a reception time for the PPDU using the calculated number of PHY midambles; and process the PPDU using the calculated reception time.

Embodiment 7: The apparatus of embodiment 6, wherein the one or more IC devices are configured to: calculate an estimate of a time duration of the PHY data portion using the indication of the length of the PPDU; calculate a time period between neighboring PHY midambles using the periodicity of PHY midambles; and calculate the number of PHY midambles in the PPDU using i) the estimate of the time duration of the PHY data portion, and ii) the calculated time period between neighboring PHY midambles.

Embodiment 8: The apparatus of embodiment 7, wherein: the periodicity of PHY midambles is in units of orthogonal frequency division multiplexing (OFDM) symbols; and the one or more IC devices are further configured to: calculate a number of OFDM symbols in the PHY data portion excluding PHY midambles using i) the indication of the length of the PPDU, and ii) the calculated number of PHY midambles, and calculate the reception time for the PPDU further using the calculated number of OFDM symbols in the PHY data portion excluding PHY midambles.

Embodiment 9: The apparatus of embodiment 8, wherein: the PPDU includes a packet extension field after the PHY data portion; and the one or more IC devices are further configured to: calculate a time period of the packet extension field using i) the indication of the length of the PPDU, ii) the calculated number of PHY midambles, and iii) the calculated number of OFDM symbols in the PHY data portion excluding PHY midambles, and calculate the reception time for the PPDU further using the calculated time period of the packet extension field.

Embodiment 10: The apparatus of any of embodiments 6-9, wherein: the PHY preamble includes a bit providing information regarding a packet extension field after the PHY data portion; and wherein the one or more IC devices are further configured to calculate the number of PHY midambles in the PPDU further using the bit providing information regarding the packet extension field after the PHY data portion.

Embodiment 11: A method for wireless communication, the method comprising: determining, at a communication device, a periodicity of physical layer (PHY) midambles to be included in PHY data portion of a PHY protocol data unit (PPDU), wherein the periodicity of PHY midambles is in units of orthogonal frequency division multiplexing (OFDM) symbols; determining, at the communication device, a number of PHY midambles to be included in the PHY data portion using i) the periodicity of PHY midambles, and ii) a number of OFDM symbols in the PHY data portion. Determining the number of PHY midambles includes: determining that a further PHY midamble will be included in the PHY data portion when a number of OFDM symbols remaining in the PHY data portion after a last PHY midamble is greater than or equal to a sum of i) the periodicity of PHY midambles, and ii) a positive integer that is less than the periodicity of PHY midambles; and determining that the further PHY midamble will not be included in the PHY data portion when the number of OFDM symbols remaining in the PHY data portion after the last PHY midamble is less than the sum of i) the periodicity of PHY midambles, and ii) the positive integer. The method also comprises: calculating, at the communication device, a transmit time for the PPDU using i) the calculated number of PHY midambles, and ii) the number of OFDM symbols in the PHY data portion; determining, at the communication device, an indication of a length of the PPDU using the calculated transmit time; and generating, at the communication device, the PPDU to include i) a PHY preamble, and ii) the PHY data portion with one or more PHY midambles included in the PHY data portion according to the calculated number of PHY midambles, wherein the PHY preamble includes i) the indication of the length of the PPDU, and ii) an indication of the periodicity of PHY midambles in the PHY data portion.

Embodiment 12: The method of embodiment 11, wherein determining the number of PHY midambles to be included in the PPDU includes: calculating a sum of i) a number of OFDM symbols in the PHY data portion, ii) one, and iii) the positive integer multiplied by negative one; and determining a smallest integer greater than or equal to: the sum divided by the periodicity of PHY midambles.

Embodiment 13: The method of embodiment 12, wherein determining the number of PHY midambles in the PPDU further includes: determining the number of PHY midambles to be included in the PPDU as the maximum of: i) zero and ii) one subtracted from the smallest integer greater than or equal to the sum divided by the periodicity of PHY midambles.

Embodiment 14: The method of either of embodiments 12 or 13, wherein the positive integer is two.

Embodiment 15: The method of embodiment 11, wherein determining the number of PHY midambles in the PPDU includes: determining a smallest integer greater than or equal to: a number of OFDM symbols in the PHY data portion divided by the periodicity of PHY midambles.

Embodiment 16: The method of embodiment 11, wherein determining the number of PHY midambles in the PPDU includes: determining a largest integer less than or equal to: a number of OFDM symbols in the PHY data portion divided by the periodicity of PHY midambles.

Embodiment 17: An apparatus, comprising: a network interface device having one or more integrated circuit (IC) devices. The one or more IC devices are configured to: determine a periodicity of physical layer (PHY) midambles to be included in PHY data portion of a PHY protocol data unit (PPDU), wherein the periodicity of PHY midambles is in units of orthogonal frequency division multiplexing (OFDM) symbols, and determine a number of PHY midambles to be included in the PHY data portion using i) the periodicity of PHY midambles, and ii) a number of OFDM symbols in the PHY data portion. Determining the number of PHY midambles includes: determining that a further PHY midamble will be included in the PHY data portion when a number of OFDM symbols remaining in the PHY data portion after a last PHY midamble is greater than or equal to a sum of i) the periodicity of PHY midambles, and ii) a positive integer that is less than the periodicity of PHY midambles; and determining that the further PHY midamble will not be included in the PHY data portion when the number of OFDM symbols remaining in the PHY data portion after the last PHY midamble is less than the sum of i) the periodicity of PHY midambles, and ii) the positive integer. The one or more IC devices are further configured to: calculate a transmit time for the PPDU using i) the calculated number of PHY midambles, and ii) the number of OFDM symbols in the PHY data portion; determine an indication of a length of the PPDU using the calculated transmit time; and generate the PPDU to include i) a PHY preamble, and ii) the PHY data portion with one or more PHY midambles included in the PHY data portion according to the calculated number of PHY midambles, wherein the PHY preamble includes i) the indication of the length of the PPDU, and ii) an indication of the periodicity of PHY midambles in the PHY data portion.

Embodiment 18: The apparatus of embodiment 17, wherein the one or more IC devices are configured to determine the number of PHY midambles to be included in the PPDU by performing acts that include: calculating a sum of i) a number of OFDM symbols in the PHY data portion, ii) one, and iii) the positive integer multiplied by negative one; and determining a smallest integer greater than or equal to: the sum divided by the periodicity of PHY midambles.

Embodiment 19: The apparatus of embodiment 18, wherein the one or more IC devices are configured to: determine the number of PHY midambles to be included in the PPDU as the maximum of: i) zero and ii) one subtracted from the smallest integer greater than or equal to the sum divided by the periodicity of PHY midambles.

Embodiment 20: The apparatus of either of embodiments 18 or 19, wherein the positive integer is two.

Embodiment 21: The apparatus of embodiment 17, wherein the one or more IC devices are configured to determine the number of PHY midambles in the PPDU by performing acts that include: determining a smallest integer greater than or equal to: a number of OFDM symbols in the PHY data portion divided by the periodicity of PHY midambles.

Embodiment 22: The apparatus of embodiment 17, wherein the one or more IC devices are configured to determine the number of PHY midambles in the PPDU by performing acts that include: determining a largest integer less than or equal to: a number of OFDM symbols in the PHY data portion divided by the periodicity of PHY midambles.

Embodiment 23: A method for wireless communication, the method comprising: receiving, at a communication device, a trigger frame to solicit a physical layer (PHY) protocol data unit (PPDU) from the communication device, wherein the trigger frame includes i) an indication of a length of the PPDU, and ii) an indication of a periodicity of PHY midambles in a PHY data portion of the PPDU; calculating, at the communication device, a number of PHY midambles in the PPDU using i) the indication of the length of the PPDU, and ii) the indication of the periodicity of PHY midambles; generating, at the communication device, the PPDU to include i) a PHY preamble, and ii) the PHY data portion with one or more PHY midambles included in the PHY data portion according to the calculated number of PHY midambles; and transmitting, from the communication device, the PPDU in response to the received trigger frame.

Embodiment 24: The method of embodiment 23, wherein calculating the number of PHY midambles in the PPDU includes: calculating an estimate of a time duration of the PHY data portion using the indication of the length of the PPDU; calculating a time period between neighboring PHY midambles using the periodicity of PHY midambles; and calculating the number of PHY midambles in the PPDU using i) the estimate of the time duration of the PHY data portion, and ii) the calculated time period between neighboring PHY midambles.

Embodiment 25: The method of either of embodiments 23 or 24, wherein: the periodicity of PHY midambles is in units of orthogonal frequency division multiplexing (OFDM) symbols.

Embodiment 26: The method of any of embodiments 23-25, wherein generating the PPDU includes calculating a number of OFDM symbols in the PHY data portion of the PPDU excluding PHY midambles using i) the indication of the length of the PPDU, and ii) the calculated number of PHY midambles.

Embodiment 27: The method of any of embodiments 23-26, wherein the PPDU includes a packet extension field after the PHY data portion, the method further comprising: calculating a time period of the packet extension field using i) the indication of the length of the PPDU, ii) the calculated number of PHY midambles, and iii) the calculated number of OFDM symbols in the PHY data portion excluding PHY midambles.

Embodiment 28: The method of any of embodiments 23-27, wherein: the trigger frame includes a bit providing information regarding a packet extension field after the PHY data portion of the PPDU; calculating the number of PHY midambles in the PPDU further comprises using the bit providing information regarding the packet extension field after the PHY data portion.

Embodiment 29: An apparatus, comprising: a network interface device having one or more integrated circuit (IC) devices. The one or more IC devices are configured to: receive a trigger frame to solicit a physical layer (PHY) protocol data unit (PPDU) from the communication device, wherein the trigger frame includes i) an indication of a length of the PPDU, and ii) an indication of a periodicity of PHY midambles in a PHY data portion of the PPDU; calculate a number of PHY midambles in the PPDU using i) the indication of the length of the PPDU, and ii) the indication of the periodicity of PHY midambles; generate the PPDU to include i) a PHY preamble, and ii) the PHY data portion with one or more PHY midambles included in the PHY data portion according to the calculated number of PHY midambles; and transmit the PPDU in response to the received trigger frame.

Embodiment 30: The apparatus of embodiment 29, wherein the one or more IC devices are configured to: calculate an estimate of a time duration of the PHY data portion using the indication of the length of the PPDU; calculate a time period between neighboring PHY midambles using the periodicity of PHY midambles; and calculate the number of PHY midambles in the PPDU using i) the estimate of the time duration of the PHY data portion, and ii) the calculated time period between neighboring PHY midambles.

Embodiment 31: The apparatus of either of embodiments 29 or 30, wherein: the periodicity of PHY midambles is in units of orthogonal frequency division multiplexing (OFDM) symbols.

Embodiment 32: The apparatus of any of embodiments 29-31, wherein the one or more IC devices are configured to calculate a number of OFDM symbols in the PHY data portion of the PPDU excluding PHY midambles using i) the indication of the length of the PPDU, and ii) the calculated number of PHY midambles.

Embodiment 33: The apparatus of any of embodiments 29-32, wherein: the PPDU includes a packet extension field after the PHY data portion; and the one or more IC devices are further configured to: calculate a time period of the packet extension field using i) the indication of the length of the PPDU, ii) the calculated number of PHY midambles, and iii) the calculated number of OFDM symbols in the PHY data portion excluding PHY midambles.

Embodiment 34: The apparatus of any of embodiments 29-34, wherein: the trigger frame includes a bit providing information regarding a packet extension field after the PHY data portion of the PPDU; the one or more IC devices are further configured to calculate the number of PHY midambles in the PPDU further using the bit providing information regarding the packet extension field after the PHY data portion.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, one or more integrated circuits (ICs), an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication, the method comprising:
   receiving, at a communication device, a physical layer (PHY) protocol data unit (PPDU), wherein the PPDU includes i) a PHY preamble and ii) PHY data portion that includes one or more PHY midambles, and wherein the PHY preamble includes i) an indication of a length of the PPDU, and ii) an indication of a periodicity of PHY midambles in the PHY data portion;
   calculating, at the communication device, a number of PHY midambles in the PPDU using i) the indication of the length of the PPDU, and ii) the indication of the periodicity of PHY midambles;
   wherein calculating the number of PHY midambles in the PPDU includes:

calculating an estimate of a time duration of the PHY data portion using the indication of the length of the PPDU;

wherein the PHY preamble includes a bit providing information regarding a packet extension field after the PHY data portion.

2. The method of claim 1, wherein:

calculating the number of PHY midambles in the PPDU further comprises using the bit providing information regarding the packet extension field after the PHY data portion.

3. An apparatus, comprising:

a network interface device having one or more integrated circuit (IC) devices configured to:

receive a physical layer (PHY) protocol data unit (PPDU), wherein the PPDU includes i) a PHY preamble and ii) PHY data portion that includes one or more PHY midambles, and wherein the PHY preamble includes i) an indication of a length of the PPDU, and ii) an indication of a periodicity of PHY midambles in the PHY data portion, calculate a number of PHY midambles in the PPDU using i) the indication of the length of the PPDU, and ii) the indication of the periodicity of PHY midambles;

calculate an estimate of a time duration of the PHY data portion using the indication of the length of the PPDU;

wherein the one or more IC devices are configured to:

calculate a time period between neighboring PHY midambles using the periodicity of PHY midambles; and calculate the number of PHY midambles in the PPDU using i) the estimate of the time duration of the PHY data portion, and ii) the calculated time period between neighboring PHY midambles.

4. An apparatus, comprising:

a network interface device having one or more integrated circuit (IC) devices configured to:

receive a physical layer (PHY) protocol data unit (PPDU), wherein the PPDU includes i) a PHY preamble and ii) PHY data portion that includes one or more PHY midambles, and wherein the PHY preamble includes i) an indication of a length of the PPDU, and ii) an indication of a periodicity of PHY midambles in the PHY data portion, calculate a number of PHY midambles in the PPDU using i) the indication of the length of the PPDU, and ii) the indication of the periodicity of PHY midambles;

calculate an estimate of a time duration of the PHY data portion using the indication of the length of the PPDU;

wherein:

the PHY preamble includes a bit providing information regarding a packet extension field after the PHY data portion; and wherein the one or more IC devices are further configured to calculate the number of PHY midambles in the PPDU further using the bit providing information regarding the packet extension field after the PHY data portion.

5. The apparatus of claim 4, wherein the one or more IC devices are configured to:

calculate a time period between neighboring PHY midambles using the periodicity of PHY midambles; and calculate the number of PHY midambles in the PPDU using i) the estimate of the time duration of the PHY data portion, and ii) the calculated time period between neighboring PHY midambles.

* * * * *